2,992,280
PREPARATION OF FLUOROFORM

Franciszek Olstowski, Freeport, and John Donald Watson, Lake Jackson, Tex., assignors to The Dow Chemical Company, Midland, Mich., a corporation of Delaware
No Drawing. Filed June 4, 1959, Ser. No. 817,986
3 Claims. (Cl. 260—653)

The present invention relates to a new method of preparing fluoroform. More particularly, the invention involves the vapor phase hydrogenation of carbon tetrafluoride.

An illustrative procedure consists essentially of heating a gaseous mixture of carbon tetrafluoride and hydrogen, or other materials which generate hydrogen under the conditions of the reaction, at a temperature sufficiently high to cause hydrogenation, and thereafter rapidly quenching the product gases. Fluoroform is then separated from the reaction mixture by conventional methods.

The present invention is based upon our discovery that hydrogenation of $CF_4$ will occur at temperatures in excess of 1700° C. Previous evidence indicated that $CF_4$ does not react with hydrogen below 900° C. At temperatures above 900° C., it was believed that $CF_4$ will react with hydrogen to produce only HF and C. This was confirmed by an experiment, Example 1, listed hereinafter, conducted at a temperature of 1500° C. in which the reaction products consisted only of HF, C, $H_2$ and some unreacted $CF_4$.

In our process, carbon tetrafluoride is passed through the reaction tube together with a substantially equimolecular proportion of hydrogen. Variations in the reactant ratio on the order of 4:1 to 1:4 showed no material effect on the conversions and yields. The process will usually and preferably be carried out at atmospheric pressures, that is, a pressure of 1 atmosphere, with higher or lower variations in pressures not affecting the conversions or yields.

Particular emphasis is placed on the quenching or cooling time in our process. In order to obtain our results, it is essential that the product vapors are rapidly cooled from the reaction temperature to a temperature of below 600° C. at a rate within the range of from about 0.001 second to about 1.0 second. Preferably, we employ a time of 0.02 second to cool the product vapors from reaction temperature to a temperature below 600° C. The particular technique employed to quench the product gases is governed by the particular apparatus available, quantity of product desired, etc. In our experiments, we employed a cold-wall technique whereby the exit walls of the reactors are equipped with water-cooled copper jackets. Other suitable methods of quenching the product gases include bubbling the effluent gases through liquid hydrogen fluoride and bubbling through mercury.

The reaction temperature range to be employed in our process is from about 1700° C. to a point below that temperature at which substantial by-products are formed or excessive reactor corrosion occurs. Temperatures below 1700° C. generally proved impractical. Preferably, we employ a temperature range of from about 1800° C. to about 2000° C.

Contact times, as calculated herein, are based on the time the reactant gases spend in that portion of the reactor that is within 100° C. of the temperature indicated herein for the operation. In our process, the contact times will generally be within the range of from about 1 second to about 0.001 second. Preferably, we employ a contact time of about 0.003 second.

Fractional distillation was employed to separate the fluoroform from the effluent gases.

The following examples are given to illustrate but are not to be construed as limiting our invention thereto.

Example 1

A carbon resistance tube reactor was provided. The reactor consisted of a graphite tube ⅜ inch O.D., ⅛ inch I.D., 12 inches in length with an estimated heated zone of approximately 4 inches. The tube was heated by an electric current of approximately 100 to 200 amperes D.C. at a potential of approximately 5 to 10 volts thereby providing a reactor temperature of approximately 1500° C. A mixture of $CF_4$ and $H_2$ was passed through the tube at a flow rate of approximately 1 cubic foot per hour. The contact time was estimated at approximately 0.1 second, and the product gases quenched to a temperature below 600° C. within 0.02 second.

A combination infra-red analysis and wet method analysis showed that $CF_4$ was the only fluorocarbon present in the product gases. Approximately 10 percent of the $CF_4$ was converted to HF and C.

Example 2

The reactor and method of heating the reactor were the same as described in Example 1.

The reactor was heated to a temperature of 1700° C. Carbon tetrafluoride was passed into the tube at a flow of 1 cubic foot per hour and hydrogen at 2 cubic feet per hour for a contact time at reaction temperature of 0.003 second. The reaction gases were quenched to a temperature below 600° C. within 0.02 second. On analysis, the effluent gas was found to consist of 40 percent $CF_4$, 3.3 percent $CF_3H$, 3.8 percent $C_2F_4$ and the remainder $H_2$.

Example 3

The reactor and method of heating the reactor were the same as described in Example 1.

The reactor was heated to a temperature of 2000° C. A mixture of $CF_4$ and $H_2$ was passed through the reactor at a rate of 2 cubic feet per hour for a contact time at reaction temperature of 0.003 second. The reaction gases were quenched to a temperature below 600° C. within 0.02 second.

On analysis the effluent gases were found to consist of 36.6 percent $CF_4$, 38.3 percent $CF_3H$ and 25 percent $C_2F_4$.

Various modifications may be made in the present invention without departing from the spirit or scope thereof and it is to be understood that we limit ourselves only as defined in the appended claims.

We claim:

1. A process of preparing fluoroform which comprises contacting hydrogen and carbon tetrafluoride at a temperature ranging from about 1700° C. to about 2100° C. for a contact time ranging from about 0.001 second to about 1.0 second, rapidly cooling the reaction vapors below 600° C. within the time interval of from about 0.001 second to about 1.0 second, and separating fluoroform from the reaction product.

2. A process of preparing fluoroform which comprises contacting hydrogen and carbon tetrafluoride at a temperature of 2000° C. for a contact time ranging from about 0.001 second to about 0.1 second, rapidly cooling the reaction vapors from the reaction temperature to a temperature below 600° C. within the time interval of from about 0.001 second to about 1.0 second, and separating fluoroform from the reaction product.

3. A process of preparing fluoroform which comprises contacting hydrogen and carbon tetrafluoride at a temperature of 2000° C. for a contact time of about 0.003 second, rapidly cooling the reaction vapors from the reaction temperature to a temperature below 600° C. within about 0.02 second, and separating fluoroform from the reaction mixture.

References Cited in the file of this patent

UNITED STATES PATENTS 2,494,064     Simons et al.  ----------  Jan. 10, 1950